United States Patent
Takahara

(10) Patent No.: US 9,046,845 B2
(45) Date of Patent: Jun. 2, 2015

(54) IMAGE FORMING APPARATUS CAPABLE OF CHANGING INTERNAL ENVIRONMENT SETTINGS, AND NON-TRANSITORY COMPUTER-READABLE MEDIUM OF CHANGING INTERNAL ENVIRONMENT SETTINGS OF IMAGE FORMING APPARATUS

(71) Applicant: KYOCERA Document Solutions Inc., Osaka (JP)

(72) Inventor: Masakazu Takahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/184,875

(22) Filed: Feb. 20, 2014

(65) Prior Publication Data

US 2014/0240749 A1 Aug. 28, 2014

(30) Foreign Application Priority Data

Feb. 26, 2013 (JP) ................. 2013-036468

(51) Int. Cl.
*G06K 15/00* (2006.01)
*G03G 15/00* (2006.01)
*G06F 21/00* (2013.01)
*H04N 1/00* (2006.01)

(52) U.S. Cl.
CPC ............... *G03G 15/50* (2013.01); *G06F 21/00* (2013.01); *G06K 15/005* (2013.01); *G06K 15/4095* (2013.01); *H04N 1/00925* (2013.01); *H04N 1/00962* (2013.01); *H04N 2201/0094* (2013.01)

(58) Field of Classification Search
USPC .................................................. 358/1.1–1.18
See application file for complete search history.

(56) References Cited

U.S. PATENT DOCUMENTS

2010/0091327 A1* 4/2010 Tamura ......................... 358/1.15
2013/0314730 A1* 11/2013 Takahashi ..................... 358/1.13

FOREIGN PATENT DOCUMENTS

JP 2005-234910 A 9/2005

* cited by examiner

*Primary Examiner* — Marcellus Augustin
(74) *Attorney, Agent, or Firm* — McDonnell Boehnen Hulbert & Berghoff LLP

(57) ABSTRACT

An image forming apparatus includes an internal environment setting, a setting changing unit, an operation invalidation unit, and a change prohibition unit. The setting changing unit changes an item of the internal environment setting in response to an operation input performed on an operation input unit or in response to an external input. The operation invalidation unit receives an invalidation instruction and invalidates the operation input performed on the operation input unit. The change prohibition unit prohibits the external input from changing an item of the internal environment setting that is locked at the operation input unit in response to the operation invalidation unit receiving the invalidation instruction.

10 Claims, 5 Drawing Sheets

CHANGE PROHIBITION TABLE

| No. | SETTING ITEM | TO BE ASSOCIATED WITH LOCKING | TO GIVE PREFERENCE TO SETTINGS IN DATA |
|---|---|---|---|
| 1 | FEED SOURCE | Yes | Off |
| 2 | EJECTION DESTINATION | No | Off |
| 3 | COPY COUNT | No | Off |
| 4 | EMULATION | Yes | Off |
| 5 | DUPLEX | Yes | Off |
| ⋮ | ⋮ | ⋮ | ⋮ |
| ⋮ | ⋮ | ⋮ | ⋮ |
| ⋮ | ⋮ | ⋮ | ⋮ |
| N-1 | LANGUAGE | Yes | Off |
| N | CANCELLATION | YES (NO IN CASE OF SUSPENSION) | Off |

FIG. 3

IMAGE FORMING APPARATUS CAPABLE OF CHANGING INTERNAL ENVIRONMENT SETTINGS, AND NON-TRANSITORY COMPUTER-READABLE MEDIUM OF CHANGING INTERNAL ENVIRONMENT SETTINGS OF IMAGE FORMING APPARATUS

RELATED APPLICATIONS

This application is based upon, and claims priority to corresponding Japanese Patent Application No. 2013-036468 filed in the Japan Patent Office on Feb. 26, 2013, the entire contents of which are incorporated herein by reference.

BACKGROUND

Unless otherwise indicated herein, the description in this section is not prior art to the claims in this application and is not admitted to be prior art by inclusion in this section.

The present disclosure relates to an image forming apparatus capable of changing internal environment settings, and a method of changing the internal environment settings of an image forming apparatus.

In a typical image forming apparatus such as a printer or a digital multi-functional apparatus, various internal environment settings such as the feed source and ejection destination are arbitrarily changeable by a user in order to be applied to the user's environment of the usage or the like.

The internal environment settings are changed by a panel operation unit (operation input unit) on the image forming apparatus. However, when a large number of unspecified users operate the panel operation unit, the internal environment settings may possibly be changed carelessly.

In addition, the internal environment settings of an image forming apparatus connected to a network may be changed by an external input from a user terminal or the like on the network.

SUMMARY

An image forming apparatus according to an aspect of the present disclosure includes an internal environment setting, a setting changing unit, an operation invalidation unit, and a change prohibition unit. The setting changing unit changes an item of the internal environment setting in response to an operation input performed on an operation input unit or in response to an external input. The operation invalidation unit receives an invalidation instruction and invalidates the operation input performed on the operation input unit. The change prohibition unit prohibits the external input from changing an item of the internal environment setting that is locked at the operation input unit in response to the operation invalidation unit receiving the invalidation instruction.

A method of changing an internal environment setting including a plurality of items of an image forming apparatus according to an aspect of the present disclose includes changing the internal environment setting in response to an operation input or in response to an external input; invalidating the operation input in response receiving an invalidation instruction; and prohibiting the external input from changing an item of the internal environment setting that is locked in response to receiving the invalidation instruction.

A non-transitory computer readable medium having stored thereon an internal environment setting comprising a plurality of items and instructions, that when executed by a processor, cause performance of a set of functions including changing an internal environment setting including a plurality of items of an image forming apparatus according to an aspect of the present disclosure includes changing the internal environment setting in response to an operation input or in response to an external input; invalidating the operation input in response receiving an invalidation instruction; and prohibiting the external input from changing an item of the internal environment setting that is locked in response to receiving the invalidation instruction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

In the accompanying drawings:

FIG. 3 shows a diagram illustrating an example of a change prohibition table according to the first embodiment;

DETAILED DESCRIPTION

Example apparatus and method are described herein. Other example embodiments or features may further be utilized, and other changes may be made, without departing from the spirit or scope of the subject matter presented herein. In the following detailed description, reference is made to the accompanying drawings, which form a part thereof.

Hereinafter, an image forming apparatus according to a first embodiment of the present disclosure will be described with reference to the drawings.

Figure 1:
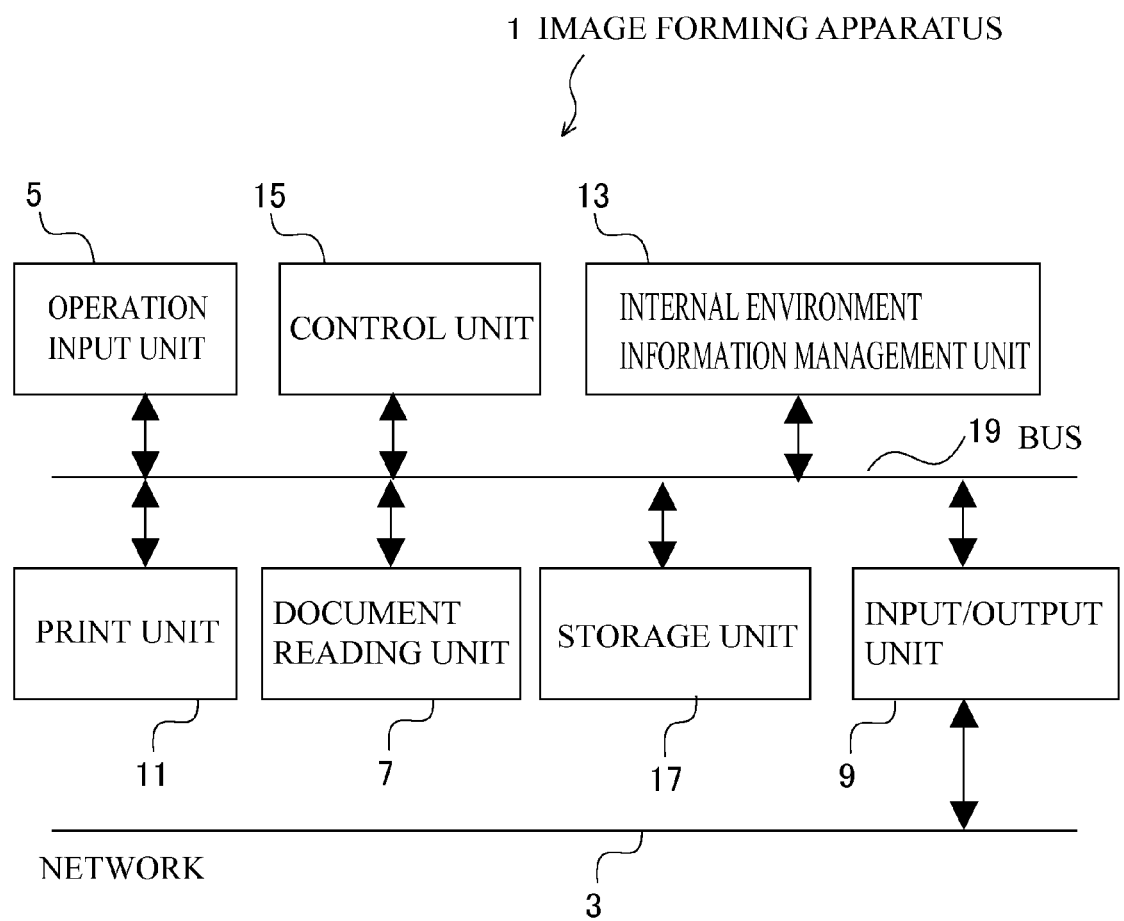
FIG. 1 shows a block diagram illustrating the schematic configuration of an image forming apparatus according to a first embodiment.

FIG. 1 shows a block diagram illustrating the schematic configuration of the image forming apparatus.

An image forming apparatus 1 is a digital multi-functional apparatus, for example. The image forming apparatus 1 performs various types of image formation such as printing based on a print job. In the image forming apparatus 1, various internal environment settings for image formation, such as the feed source and ejection destination, are set. The internal environment settings are changeable in accordance with a user's environment or the like.

The image forming apparatus 1 includes a main body unit, and the main body unit includes an operation input unit 5, a document reading unit 7, an input/output unit 9, a print unit 11, an internal environment information management unit 13, a control unit 15, a storage unit 17, and the like. These units are interconnected by a bus 19.

The operation input unit 5 includes a keyboard, a touch panel, and/or the like. The user inputs a print execution instruction or inputs internal environment settings to the image forming apparatus 1 via the operation input unit 5. In addition, the operation input unit 5 displays the status of the operation.

The document reading unit 7 includes a scanner. The document reading unit 7 reads a document image in response to an instruction input from the operation input unit 5 or the like, and obtains image data.

The input/output unit 9 is an interface that transmits data to and receives data from an external terminal such as a user terminal (hereinafter referred to as a "user terminal"), which is an information processing apparatus, via a network 3 such as a local area network ("LAN") in accordance with a certain protocol. In this embodiment, internal environment settings are changeable via a web page or a print job from the user terminal.

The print unit 11 is a controller including an engine such as a print mechanism, a processor, a read-only memory ("ROM") storing an operation program of the processor, and the like. The print unit 11 expands image data from the document reading unit 7 or image data of a print job from the user terminal into image data for image formation, and forms an image on a sheet.

The internal environment information management unit 13 is a controller including a processor, a ROM storing an operation program of the processor, and the like. The internal environment information management unit 13 is in charge of management regarding changing of the internal environment settings.

The control unit 15 has a main control function that controls the above-described units. The control unit 15 includes a central processing unit ("CPU") that serves as a main part of a control and processing function, and a ROM storing an operation program of the CPU. Note that the control unit 15 may be provided with a configuration including the internal environment information management unit 13. In this case, the internal environment information management unit 13 is configured as a function of the control unit 15.

The storage unit 17 is a storage device such as a hard disk drive ("HDD") or a random-access memory ("RAM"). In addition, a CompactFlash (registered trademark) memory ("CF"), a Universal Serial Bus ("USB") memory, or the like that is detachably attached externally may also be used.

Figure 2:
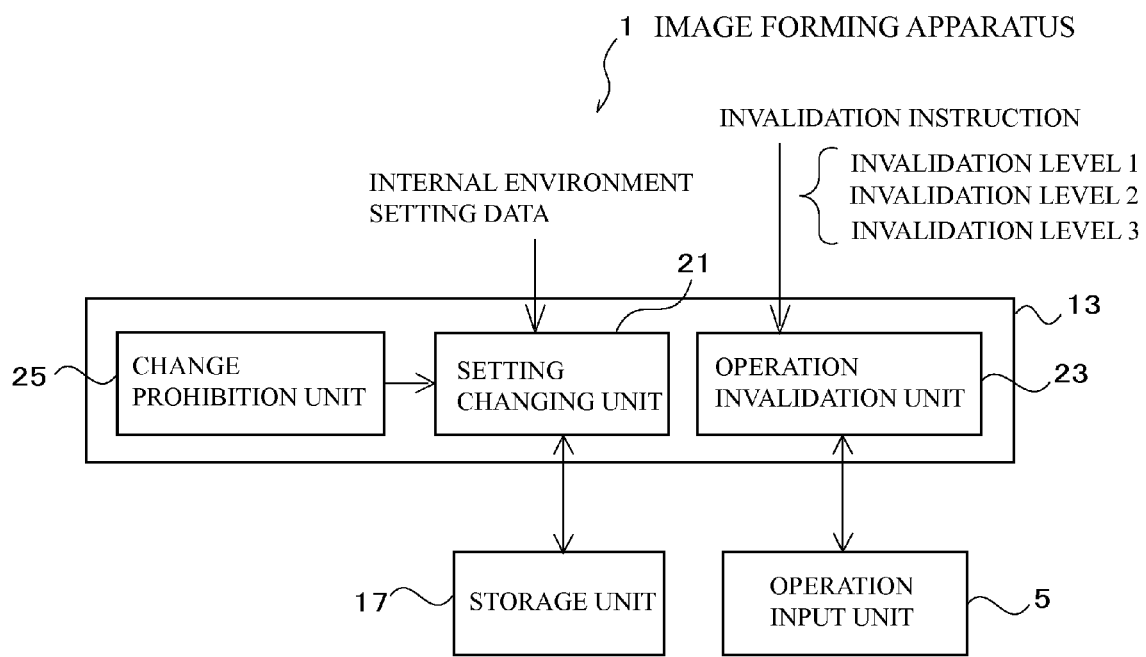
FIG. 2 shows a block diagram illustrating the functional configuration of an internal environment information management unit of the image forming apparatus according to the first embodiment.

FIG. 2 shows a block diagram illustrating the functional configuration of the internal environment information management unit of the image forming apparatus illustrated in FIG. 1.

In the image forming apparatus 1 according to this embodiment, the internal environment information management unit 13 functions, as a result of execution of a program, as a setting changing unit 21, an operation invalidation unit 23, and a change prohibition unit 25. Accordingly, the image forming apparatus 1 changes and manages the internal environment settings.

The setting changing unit 21 realizes a setting changing function, and changes the internal environment settings in response to an operation input performed on the operation input unit 5 or an external input. An external input corresponds to, for example, an operation input performed on the user terminal or an input in response to connection of an external storage medium such as a USB memory. The internal environment settings are retained in the storage unit 17, for example, and the setting changing unit 21 retains, in the storage unit 17, the content of changes made to the internal environment settings in accordance with the operation unit by overwriting the internal environment settings, for example.

The operation invalidation unit 23 realizes an operation invalidation function. The operation invalidation unit 23 invalidates a particular operation input performed on the operation input unit 5 in response to an input of an invalidation instruction given to the operation input unit 5. Hereinafter, "invalidation of an operation input performed on the operation input unit 5" may be referred to as "locking of the operation input unit 5". In response to this locking of the operation input unit 5, the operation input unit 5 is prevented from being operated by a large number of unspecified users. Accordingly, the internal environment settings are prevented from being changed carelessly, and the print result may be prevented from being a print result unintended by the user.

The operation invalidation unit 23 receives an invalidation instruction, which specifies an invalidation level, and accordingly invalidates an operation input performed on the operation input unit 5 if the operation input is associated an invalidation level that is greater than or equal to the received invalidation level. The operation inputs and their associated invalidation levels may be stored as internal environment settings in the storage unit 17. An invalidation instruction can be given from the operation input unit 5 or the user terminal. In an example operation, an invalidation instruction may be realized by receiving a selection of an invalidation level on the operation input unit 5 or the user terminal.

The invalidation levels are divided into three levels, for example, in this embodiment. Note that the number of invalidation levels is arbitrary—any number of levels may be implemented in order to achieve varying degrees of invalidation. The greater the number of invalidation levels, the more detailed the management of locking of the operation input unit 5 becomes.

In one example, at the invalidation level 1, operation inputs other than those related to the internal environment settings are invalidated. For example, at the invalidation level 1, only a printing cancellation key is invalidated. At the invalidation level 2, operation inputs related to some items of the internal environment settings are invalidated. At the invalidation level 3, operation inputs related to all the items of the internal environment settings are invalidated. For example, all the operation inputs are invalidated at the invalidation level 3.

The change prohibition unit 25 realizes a change prohibition function. The change prohibition unit 25 prohibits an external input from changing items of the internal environment settings that become unchangeable (i.e. locked) at the operation input unit 5 in response to an invalidation instruction from the operation input, for example. This prohibition of changes is collectively performed for items of the internal environment settings associated with the same invalidation level. Note that, with each ascending invalidation level, the internal environment settings associated with a lower invalidation level are also prohibited from changing. In other words, as invalidation level increases, the internal environment settings that are prohibited from changing accumulate, such that a higher invalidation level prohibits the same or more internal environment settings than a lower invalidation level. In this embodiment, changes are prohibited by referring to a change prohibition table in the storage unit 17. FIG. 3 illustrates an example of the change prohibition table.

FIG. 3 illustrates an example change prohibition table, which specifies whether each internal environment setting item is associated with locking of the operation input unit 5 and whether each internal environment setting item is given preference to settings in data. An internal environment setting item may be set to be associated with locking of operation input unit 5 (Yes) or not (No). Additionally, an internal environment setting item may be set to give preference to settings in data (Yes) or to not give preference to settings in data (No). Furthermore, an internal environment setting item, such as "cancellation," may be generally associated with locking (Yes), but not to be associated with under a special circumstance, such as in the case of suspension; this will be described in a second embodiment.

By referring to this change prohibition table, the change prohibition unit 25 prohibits an external input from changing certain items of the internal environment settings in association with the invalidation level of the operation input unit 5. If the invalidation level to be associated is set for each of the items of the internal environment settings, an external input can be easily prohibited from changing the items. Alternatively, at the time the operation input unit 5 is locked, the change prohibition unit 25 may sequentially determine items of the internal environment settings that become locked.

Since the change prohibition table in this embodiment has a flag indicating whether to be associated with locking of the operation input unit 5, it is possible to enable selection of whether to prohibit an external input from changing items of the internal environment settings that become locked at the operation input unit 5 upon setting the invalidation level. Therefore, the change prohibition unit 25 in this embodiment prohibits an external input from changing some or all of the items of the internal environment settings that become locked at the operation input unit 5 in response to setting an invalidation level.

In addition, since the change prohibition table in this embodiment has a flag indicating whether to give preference to settings in data of a print job or a web page, it is possible to selectively permit an external input to change items of the internal environment settings that become locked at the operation input unit 5 in response to an invalidation level being set.

In the case where the operation input unit 5 is locked, items of the internal environment settings within a certain range collectively become locked. Therefore, if there is an item that is desired to be changeable among items of the internal environment settings that are locked at the operation input unit 5, the desired item can be made changeable by editing the change prohibition table.

It is preferable that only an administrator, for example, be capable of setting whether to be associated with locking of the operation input unit 5 and whether to give preference to settings in data, as specified in the change prohibition table.

Figure 4:
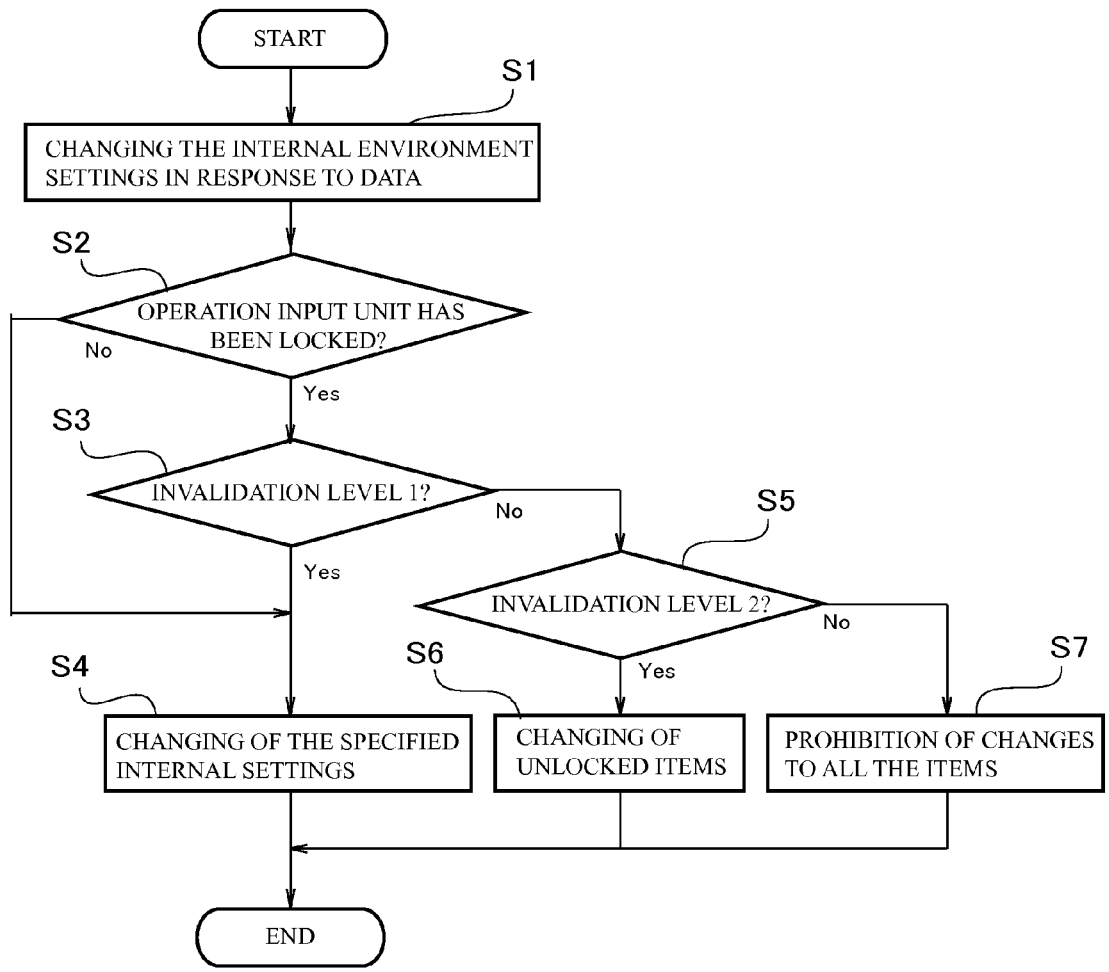
FIG. 4 shows a flowchart illustrating a process of changing and managing internal environment settings according to the first embodiment.

FIG. 4 shows a flowchart illustrating a process of changing and managing the internal environment settings.

The process of changing and managing the internal environment settings in this embodiment performs "an operation of changing the internal environment settings in response to data" in step S1. Data for changing the internal environment settings, which is input by an operation input performed on the user terminal or by connecting a USB memory, is received. This process can be performed by the setting changing unit 21 or the like. In response to completion of step S1, the process proceeds to step S2. Note that the accepted data is for changing a specified item or items of the internal environment settings.

In step S2, a process of "the operation input unit has been locked?" is performed. In this process, the setting changing unit 21 or the like determines whether the operation input unit 5 has been locked. This determination can be performed based on, for example, locking information, which is obtained at the time the operation invalidation unit 23 locks the operation input unit 5 and retained in the storage unit 17.

In the case where the operation input unit 5 has been locked (YES), the process proceeds to step S3. In the case where the operation input unit 5 has not been locked (NO), the process proceeds to step S4.

In step S3, a process of "invalidation level 1?" is performed. In this process, the setting changing unit 21 or the like determines whether the level of locking of the operation input unit 5 is the invalidation level 1. This determination can also be performed based on the locking information in the storage unit 17 or the like.

In the case of the invalidation level 1 (YES), the process proceeds to step S4. In the case where the locking level is other than the invalidation level 1 (NO), the process proceeds to step S5. Note that step S4 will be described later.

In step S5, a process of "invalidation level 2?" is performed. In this process, the setting changing unit 21 or the like determines whether the level of locking of the operation input unit 5 is the invalidation level 2, as with the case of step S3.

In the case of the invalidation level 2 (YES), the process proceeds to step S6. In the case of the invalidation level 3 (NO), the process proceeds to step S7. Note that in other embodiments, more levels may be implemented to set varying degrees of invalidation.

In step S4, S6, and S7, the setting changing unit 21 changes the internal environment settings or prohibits changes to the internal environment settings in accordance with the invalidation level.

In step S4, "changing of the specified internal environment settings" is performed. This process is in the case where the operation input unit 5 has not been locked or, if the operation input unit 5 has been locked, operation inputs other than those related to the internal environment settings have been locked.

Therefore, in this step, an external input is not prohibited from changing the internal environment settings. Thus, specified items of the internal environment settings are changed as indicated in the data accepted in step S1. Although the operation input unit 5 has not been locked, there are items of the internal environment settings that are unchangeable by people other than the administrator. Changes to these items are also prohibited in this step.

In step S6, "changing of unlocked items of the internal environment settings" is performed. This process is in the case where operation inputs related to some items of the internal environment settings are locked at the operation input unit 5.

Therefore, the change prohibition unit 25 prohibits the data in step S1 from changing items of the internal environment settings that become unchangeable at the operation input unit 5 in response to locking. In other words, the setting changing unit 21 changes items other than items of the internal environment settings that are prohibited by the change prohibition unit 25 from being changed.

In step S7, "prohibition of changes to all the items of the internal environment settings" is performed. This process is in the case where all the operation inputs are locked at the operation input unit 5.

Therefore, the change prohibition unit 25 prohibits the data in step S1 from changing all the items of the internal environment settings that become unchangeable at the operation input unit 5 in response to locking. Thus, the setting changing unit 21 does not change the items of the internal environment settings.

In response to completion of step S4, S6, or S7 in accordance with the invalidation level as has been described above, the process of changing and managing the internal environment settings ends.

The image forming apparatus 1 according to this embodiment can prohibit an external input from changing items of the internal environment settings in association with invalidation (locking) of an operation input performed on the operation input unit 5. This selective locking using invalidation levels improves convenience.

In response to an input of an invalidation instruction given by selecting one from among multiple invalidation levels at, for example, operation input unit 5, the operation invalidation unit 23 invalidates an operation input within a range in accordance with the selected invalidation level. This range may be any operation inputs having the same or a lower invalidation level. Therefore, the operation input unit 5 can be easily locked (and, therefore, certain operation inputs can be easily locked) simply by selecting an invalidation level for the operation invalidation unit 23. In addition, an external input can be easily prohibited from changing items of the internal environment settings within a range in accordance with the selected invalidation level.

Further in this embodiment, simply by selecting an invalidation level for the operation invalidation unit 23, the change prohibition unit 25 can collectively prohibit changes to items of the internal environment settings associated with each invalidation level. Therefore, an external input can be particularly easily prohibited from changing multiple items of the internal environment settings.

Further, if the locked operation input unit 5 is unlocked, in association with this unlocking, prohibition of changes made by an external input to the internal environment settings can also be collectively removed. It is thus particularly easily to switch between prohibition and removal of prohibition of changes made by an external input to multiple items of the internal environment settings.

In addition in this embodiment, in the change prohibition table, it is possible to enable selection of whether to prohibit an external input from changing items of the internal environment settings that become locked at the operation input unit 5 upon setting an invalidation level. Therefore, the flexibility in prohibiting an external input from changing items of the internal environment settings can be improved even in the case where the items are associated with locking of the operation input unit 5.

Therefore in this embodiment, in the change prohibition table, it is possible to selectively permit an external input to change items of the internal environment settings that become locked at the operation input unit 5 in response to an invalidation level being set. Therefore, if there is an item that is desired to be changeable among items of the internal environment settings that are locked at the operation input unit 5, the desired item can be made changeable, and the flexibility of the locking improves.

Hereinafter, an image forming apparatus according to the second embodiment of the present disclosure will be described with reference to the drawings.

Figure 5:
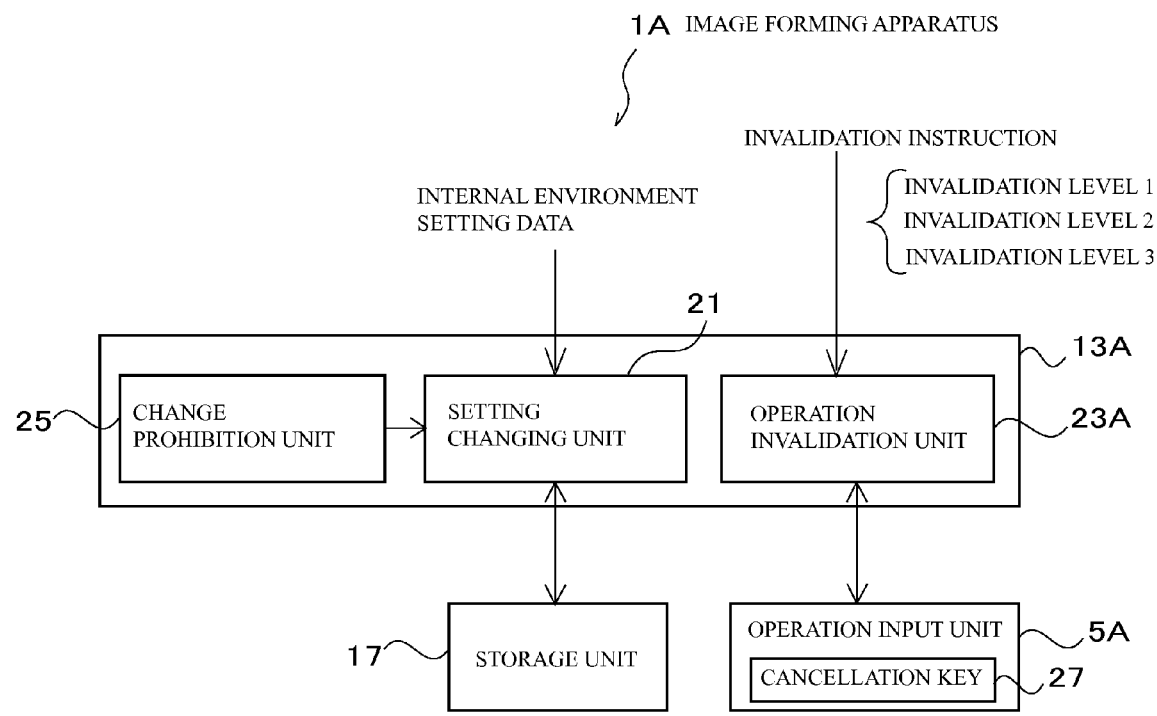
FIG. 5 shows a block diagram illustrating the functional configuration of an internal environment information management unit of an image forming apparatus according to a second embodiment.

FIG. 5 shows a block diagram illustrating the functional configuration of an internal environment information management unit of the image forming apparatus. Since this embodiment has a basic configuration common to that of the first embodiment, corresponding configurations are given the same references or the same references with A, and overlapping descriptions are omitted.

In this embodiment, in the case where an operation input unit 5A inputs execution of suspension and cancellation of printing with a cancellation key 27 in a consecutive manner and an operation invalidation unit 23A invalidates the operation input of the cancellation key 27, suspension of printing input by the cancellation key 27 is validated, and thus suspension of printing is permitted.

That is, the cancellation key 27 of the operation input unit 5A suspends printing being processed at the time when the cancellation key 27 is operated once, such as pressed. The cancellation key 27 terminates or cancels the suspended printing when the cancellation key 27 is operated again, such as pressed.

The operation invalidation unit 23A validates the suspension of printing, which occurs by operating the cancellation key 27 once, even in the case where all operation inputs of the operation input unit 5A are locked (even in the case where the cancellation key 27 is locked). Therefore, in the change prohibition table illustrated in FIG. 3, as has been described above, for the setting item "cancellation", whether to be associated with locking of the operation input unit 5 is "Yes (No in case of suspension)".

Note that cancellation of printing is validated as usual after the locked operation input unit 5A is unlocked by the administrator or the like.

In this embodiment, in addition to achieving the same operation and advantages as those in the first embodiment, even in the case where all operation inputs performed on the operation input unit 5A are invalidated, printing can be suspended by the cancellation key 27.

Therefore, a useless printing output can be prevented in the case where a print instruction is given by mistake. After the printing has been suspended, the printing, which is actually unnecessary, can be cancelled by unlocking the locked operation input unit 5A by the administrator or by cancelling the printing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

What is claimed is:

1. An image forming apparatus comprising:
a setting changing unit configured to change an internal environment setting in response to an operation input performed on an operation input unit or in response to an external input;
an operation invalidation unit configured to invalidate the operation input performed on the operation input unit in response to receiving an invalidation instruction; and
a change prohibition unit configured to prohibit the external input from changing an item of the internal environment setting that is locked at the operation input unit in response to the operation invalidation unit receiving the invalidation instruction, wherein receiving the invalidation instruction at the operation input unit sets an invalidation level of the operation input unit, and wherein the operation invalidation unit is further configured to invalidate a set of operation inputs associated with an invalidation level if the set invalidation level of the operation input unit is greater than or equal to the invalidation level associated with the set of operation inputs.

2. The image forming apparatus according to claim 1, wherein the change prohibition unit is further configured to collectively prohibit changes to items of the internal environment setting that correspond to each of the invalidation levels.

3. The image forming apparatus according to claim 1,
wherein the operation input unit includes a cancellation key that, responsive to being pressed and a cancellation item of the internal environment setting associated with the cancellation key being validated, suspends and cancels an image formation operation in a consecutive manner, and wherein the operation invalidation unit is further configured to validate suspending the image formation operation by the cancellation key if the cancellation item of the internal environment setting associated with the cancellation key is invalidated.

4. The image forming apparatus according to claim 1,
wherein receiving the invalidation instruction at the operation input unit sets an invalidation level of the operation input unit, and wherein the operation invalidation unit is further configured to invalidate a set of operation inputs associated with an invalidation level if the set invalidation level of the operation input unit is equal to the invalidation level associated with the set of operation inputs.

5. The image forming apparatus according to claim 4,
wherein a set of items from the plurality of items of the internal environment setting is associated with an invalidation level, and wherein the change prohibition unit is further configured to prohibit changing of the set of items of the internal environment setting associated with an invalidation level if the set invalidation level of the operation input unit is equal to the invalidation level of the set of items of the internal environment setting.

6. A non-transitory computer-readable medium having stored thereon an internal environment setting comprising a plurality of items and instructions, that when executed by a processor, cause performance of a set of functions comprising:

changing an item of the internal environment setting in response to an operation input or in response to an external input;

invalidating the operation input in response to receiving an invalidation instruction; and prohibiting the external input from changing the item of the internal environment setting that is locked in response to receiving the invalidation instruction, wherein receiving the invalidation instruction sets an invalidation level, and wherein a set of operation inputs associated with an invalidation level is invalidated if the set invalidation level is greater than or equal to the invalidation level of the set of operation inputs.

7. The non-transitory computer-readable medium of claim 6,
wherein a set of items from the plurality of items of the internal environment setting is associated with an invalidation level, and wherein changing of the set of items of the internal environment setting associated with an invalidation level is prohibited if the set invalidation level is greater than or equal to the invalidation level of the set of items of the internal environment setting.

8. The non-transitory computer-readable medium of claim 6,
wherein the non-transitory computer-readable medium includes a cancellation key that, responsive to being pressed and a cancellation item of the internal environment setting associated with the cancellation key being validated, suspends and cancels an image formation operation in a consecutive manner, and wherein, if the cancellation item of the internal environment setting associated with the cancellation key is invalidated, a pressing of the cancellation key validates suspending the image forming operation.

9. The non-transitory computer-readable medium of claim 6,
wherein receiving the invalidation instruction sets an invalidation level, and wherein a set of operation inputs associated with an invalidation level is invalidated if the set invalidation level is equal to the invalidation level of the set of operation inputs.

10. The non-transitory computer-readable medium of claim 9,
wherein a set of items from the plurality of items of the internal environment setting is associated with an invalidation level, and wherein changing of the set of items of the internal environment setting associated with an invalidation level is prohibited if the set invalidation level is equal to the invalidation level of the set of items of the internal environment setting.

* * * * *